United States Patent
Wingen

(10) Patent No.: US 10,730,373 B2
(45) Date of Patent: Aug. 4, 2020

(54) ARRANGEMENT AND METHOD FOR PRODUCING AN ARRANGEMENT FOR A VEHICLE ROOF AND A SYSTEM FOR A MOTOR VEHICLE WITH A VEHICLE ROOF

(71) Applicant: WEBASTO SE, Stockdorf (DE)

(72) Inventor: Bernhard Wingen, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 162 days.

(21) Appl. No.: 16/068,711

(22) PCT Filed: Jan. 18, 2016

(86) PCT No.: PCT/EP2016/050915
§ 371 (c)(1),
(2) Date: Jul. 9, 2018

(87) PCT Pub. No.: WO2017/125125
PCT Pub. Date: Jul. 27, 2017

(65) Prior Publication Data
US 2019/0023110 A1    Jan. 24, 2019

(51) Int. Cl.
*B60J 7/02*    (2006.01)
*B29C 45/14*    (2006.01)
(Continued)

(52) U.S. Cl.
CPC .......... *B60J 7/02* (2013.01); *B29C 45/14344* (2013.01); *B29C 45/14754* (2013.01);
(Continued)

(58) Field of Classification Search
CPC ..... B60J 7/02; B60J 7/028; B60J 7/057; B60J 7/053; B29C 45/14344; B29C 45/14754
(Continued)

(56) References Cited

U.S. PATENT DOCUMENTS 6,494,529 B1 * 12/2002 Manders ............ B60J 7/02
296/221
2013/0099528 A1   4/2013 Grimm et al.
(Continued)

FOREIGN PATENT DOCUMENTS

DE    2420264 A1   11/1975
DE    3637462 A1   5/1988
(Continued)

OTHER PUBLICATIONS

International Search Report for PCT/EP2016/050915 dated Oct. 14, 2016 and English translation submitted herewith (6 pages).

*Primary Examiner* — Jason S Morrow
(74) *Attorney, Agent, or Firm* — Fitch, Even, Tabin & Flannery, LLP

(57) ABSTRACT

A method for producing an arrangement for a vehicle roof can have the steps of providing a first element with a first end and a second end, the element being couplable by the first end to the vehicle roof. The method can also have the steps of providing a pumpable substance with predetermined material properties, and applying the provided substance by injection molding at a predetermined position at the second end of the first element and thereby forming a second element such that the second element is coupled to the first element and is pivotable relative to the first element about an axis of rotation (A). An arrangement and system for a vehicle roof is also provided.

8 Claims, 4 Drawing Sheets

(51) Int. Cl.
*B60J 7/057* (2006.01)
*B60J 7/053* (2006.01)
*B29K 77/00* (2006.01)
*B29K 307/04* (2006.01)
*B29L 31/30* (2006.01)

(52) U.S. Cl.
CPC ............... *B60J 7/028* (2013.01); *B60J 7/057* (2013.01); *B29K 2077/00* (2013.01); *B29K 2307/04* (2013.01); *B29K 2715/00* (2013.01); *B29L 2031/3002* (2013.01); *B60J 7/053* (2013.01)

(58) Field of Classification Search
USPC .............................. 296/216.04, 216.05, 223
See application file for complete search history.

(56) References Cited

U.S. PATENT DOCUMENTS

2016/0126886 A1* 5/2016 Eo ........................... H02S 20/30
  296/216.04
2017/0297238 A1* 10/2017 Bjork .................. B29C 45/1418

FOREIGN PATENT DOCUMENTS

DE        4227452 A1   3/1993
DE   10 2011 018 151 A1  10/2012

* cited by examiner

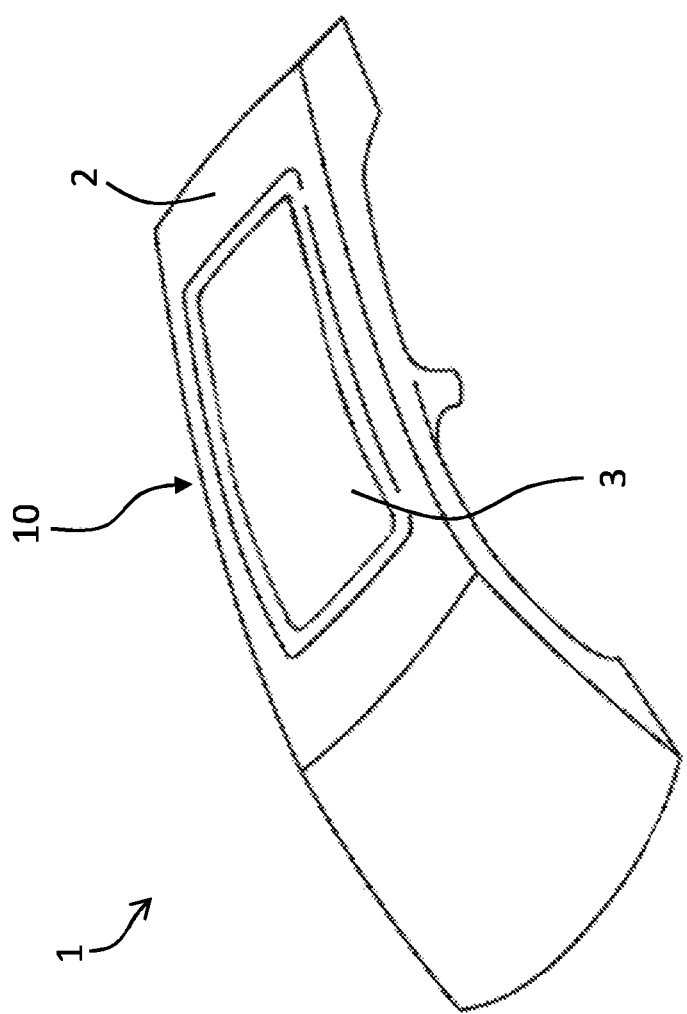

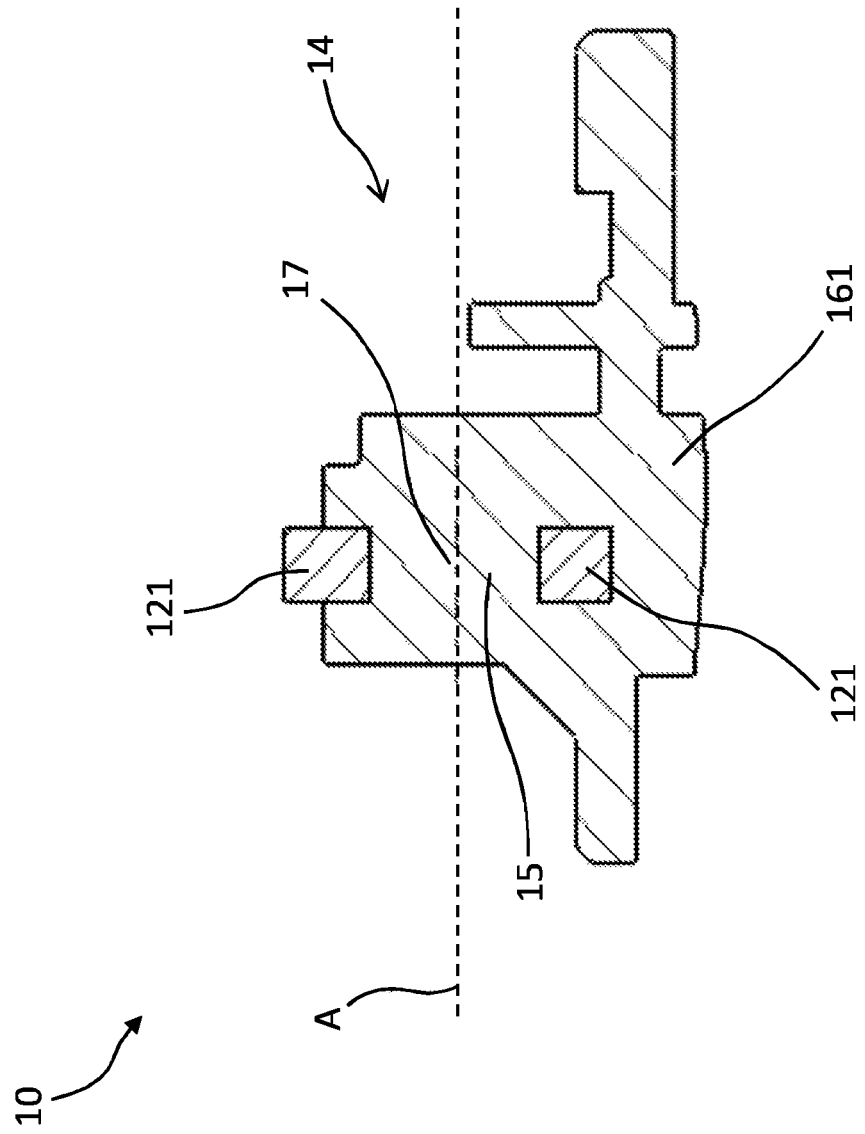

ARRANGEMENT AND METHOD FOR PRODUCING AN ARRANGEMENT FOR A VEHICLE ROOF AND A SYSTEM FOR A MOTOR VEHICLE WITH A VEHICLE ROOF

CROSS-REFERENCE TO RELATED APPLICATIONS

This application is a U.S. national phase application filed under 35 U.S.C. § 371 of International Application No. PCT/EP2016/050915, filed Jan. 18, 2016, designating the United States, which is hereby incorporated herein by reference in its entirety for all purposes.

FIELD

The invention relates to an arrangement and to a corresponding method for producing an arrangement for a vehicle roof, and to a system for a motor vehicle with a vehicle roof, which permit a simple and cost-effective mechanism for the vehicle roof.

BACKGROUND

Arrangements for vehicle rooves optionally have mechanisms which, for example, permit an opening of the vehicle roof or of a cover in the vehicle roof. Such an arrangement with a cover for a vehicle roof is known, for example, as a spoiler roof which is raised, for example by means of a raising lever, during an opening operation and is displaced in the direction of a vehicle rear by means of a drive carriage. Guide mechanisms are customarily provided in lateral regions of the cover in order to raise the cover into a ventilation position and optionally to further open up the roof opening in the opening direction. The guide mechanisms capable of this have, for example, lever bearings and/or slotted guide mechanisms. Such an arrangement which permits raising and displacing of a cover is described, for example, in the document DE 10 2011 018 151 A1.

An object on which the invention is based is to provide an arrangement and a corresponding method for producing an arrangement for a vehicle roof, which permit a simple and cost-effective design of mechanisms for the vehicle roof.

The object is achieved by the features of the independent patent claims.

SUMMARY

A method according to the invention for producing an arrangement for a vehicle roof comprises providing a first element with a first end and a second end, said element being couplable by means of the first end to the vehicle roof. The method furthermore comprises providing a pumpable substance with predetermined material properties, and applying the substance by means of injection molding at a predetermined position at the second end of the first element and thereby forming a second element such that the second element is coupled to the first element and is pivotable relative to the first element about an axis of rotation.

By means of such a method, an arrangement for a vehicle roof can be realized in a cost-effective and simple manner, said arrangement merely comprising two elements which are rotatable with respect to each other. No additional, separate rotary element is required in order to permit reliable pivoting of the first and second elements relative to each other. Owing to the fact that the second element is formed by means of injection molding, it is not required to provide additional coupling elements, such as bolts or rivets, in order to attach the second element to the first element.

The described method thus, for example, makes a contribution to a simple installation process of a space-saving guide or cover mechanism which permits reliable and controlled moving of the vehicle roof and/or of a cover. For example, the first and second elements are coupled to each other as levers and realize part of a lever mechanism for opening the vehicle roof.

The vehicle roof is designed, for example, as a convertible roof, on the lateral regions of which a pair of the two described elements is in each case arranged and permits opening or folding of the convertible roof. The first and second elements can furthermore also realize components of a darkening device or further arrangements for a vehicle roof, which require elements which are pivotable with respect to one another.

According to an embodiment, the method comprises providing the first element as a raising lever which is couplable by means of the first end to a cover. The method furthermore comprises applying the substance by means of injection molding at a predetermined position at the second end of the raising lever and thereby forming the second element as a plastics slider such that the plastics slider is coupled to the raising lever and is pivotable relative to the raising lever about the axis of rotation.

By means of the described embodiment of the method, an arrangement for guiding a cover for a vehicle roof can be realized, said arrangement having a particularly simple construction and being able to be produced cost-effectively. Such an arrangement comprises the raising lever and the plastics slider as elements which are rotatable with respect to each other, and also permits reliable raising and displacing of a cover in a vehicle roof without a separate rotary element. A cost-effective and space-saving guide or cover mechanism, which permits controlled moving of the cover, can thus be realized in a simple manner by means of the described method.

During formation of the plastics slider by means of injection molding or encapsulating the second end of the raising lever by injection molding, it is ensured that said plastics slider does not stick permanently to the raising lever and a relative rotational movement of said two components with respect to each other is possible. The raising lever is realized, for example, as a metal lever to which the provided substance, from which the plastics slider is formed by means of injection molding, is applied. The provided substance has correspondingly predetermined material properties having a non-adhering or easily detachable behavior of the shape of the plastics slider on the raising lever. For example, the plastics slider is manufactured from a material combination consisting of polyamide and carbon fiber and advantageously has little friction in respect of adjacent surfaces and edges to the raising lever, and therefore, with coordination of the respective materials used, reliable and efficient pivoting of the raising lever with respect to the plastics slider is realized.

Within the scope of the further description, features and properties of the raising lever and of the plastics slider will be discussed by way of representation. However, the embodiment should correspondingly be understood as features and properties of the first and second elements, even if said elements realize, for example, mutually pivotable levers or other components which are designed as described.

According to an embodiment of the method, the providing of the raising lever comprises providing the raising lever with a recess at the second end such that, by applying the provided substance by means of injection molding, the plastics slider is formed with a rotary element which is arranged in the recess.

This embodiment of the method constitutes a possibility of forming the plastics slider rotatably on the raising lever by means of injection molding. Within the scope of the injection molding process, the provided substance is applied in a predetermined manner to the second end of the raising lever and fills cavities, like the recess of the raising lever, in a specific manner. The plastics slider is thereby partially arranged in the recess of the raising lever and optionally penetrates said recess if the recess of the raising lever is designed as a penetrating recess. The axis of rotation about which the plastics slider is formed pivotably relative to the raising lever is then defined, for example, at this point. Additional components and process steps which fasten the plastics slider to the raising lever and define an axis of rotation can therefore be dispensed with. The plastics slider can thereby be formed with the rotary element in a particularly space-saving manner and in particular can contribute to a reduced requirement for construction space with regard to height. The height refers here to a vertical of a motor vehicle in an operationally ready state.

According to an embodiment of the method, the providing of the raising lever comprises providing the raising lever with a predetermined radial geometry at the second end such that, by applying the provided substance by means of injection molding, the plastics slider is formed with a radial geometry.

Owing to the formation by means of injection molding, the plastics slider is adapted to the shape of the second end of the raising lever and has a correspondingly complementary shape in this region. For example, the raising lever has, at the second end, and therefore the plastics slider formed at the second end also has a predetermined radial geometry which permits reliable rotation or pivoting of the plastics slider relative to the raising lever. Such a radial geometry is similar, for example, to a rotary joint, and therefore the raising lever and the plastics slider are reliably coupled to each other and are designed to be rotatable with respect to each other.

The plastics slider is formed by means of injection molding, for example in a mold which has an upper mold and a lower mold with predetermined recesses and cavities. The provided raising lever is clamped, for example, with its second end in a region between the upper mold and lower mold, in which cavities which are present predetermine the shape to be formed of the plastics slider. By means of said cavities being filled with the provided substance, the plastics slider is formed specifically at or around the second end of the raising lever.

According to an embodiment of the method, the providing of the raising lever comprises punching and/or stamping a metal blank and thereby forming the raising lever with the first end and second end and the recess and/or the predetermined radial geometry.

This embodiment of the method includes the formation of the raising lever such that, for example, before the formation of the plastics slider, the raising lever is configured with the desired geometry. The predetermined geometry of the raising lever optionally comprises edges, bent portions, projecting regions and/or recesses which are punched, pressed and/or stamped into the provided metal blank at predetermined positions. It is thereby possible, for example, for the previously described radial geometry and/or recess to be realized at the second end of the raising lever.

An arrangement according to the invention for a cover for a vehicle roof comprises a raising lever with a first end and a second end, said raising lever being couplable by means of the first end to the cover. The arrangement furthermore comprises a plastics slider which is formed by means of injection molding at a predetermined position at the second end of the raising lever such that the plastics slider is coupled to the raising lever and is arranged pivotably relative to the raising lever about an axis of rotation.

The described arrangement can be produced in particular by means of one of the previously described methods and makes it possible in a simple and cost-effective manner to design a lever or guide mechanism for a cover in a vehicle roof. All of the features and properties of the previously described methods are therefore also disclosed for the arrangement, and vice versa.

The described arrangement has a small number of components and can be correspondingly realized with a small number of production or installation steps. It can therefore be produced cost-effectively and in a time-saving manner and can be integrated in a space-saving manner in the region of a vehicle roof.

According to an embodiment of the arrangement, the raising lever has, at the second end, a predetermined radial geometry about which the plastics slider is formed by means of injection molding.

According to an embodiment of the arrangement, the raising lever has a recess at the second end, and the plastics slider has a rotary element which is formed by means of injection molding and is arranged in the recess of the raising lever. The rotary joint essentially realizes the axis of rotation about which the plastics slider can pivot relative to the raising lever, and is in particular formed integrally with the plastics slider as part thereof.

A system according to the invention for a motor vehicle with a vehicle roof comprises a cover which is designed to optionally open up and to close a roof opening in the vehicle roof, and one of the previously described arrangements. The raising lever is coupled by means of the first end to the cover and by means of the second end to the plastics slider. The plastics slider is in turn arranged in a guide rail or is coupled thereto in order to be able to raise the cover for opening up the roof opening in the vehicle roof and to adjust same for closing the roof opening in the vehicle roof.

The described system for a motor vehicle with a vehicle roof realizes, for example, a roof module which can be arranged in the vehicle roof of the motor vehicle in order to permit reliable and simple erecting, displacing and readjustment of the cover by means of the described mechanism.

BRIEF DESCRIPTIONS OF THE DRAWING

Exemplary embodiments of the invention are explained in more detail below with reference to the schematic drawings, in which:

FIG. 1 shows a vehicle roof in a perspective view,

FIGS. 2A-2B show an exemplary embodiment of a raising lever and a plastics slider for a cover.

DETAILED DESCRIPTION

Elements of identical design or function are identified by the same reference signs throughout the figures.

FIG. 1 schematically shows, in a perspective view, a system for a motor vehicle 1, which comprises a cover 3 and an arrangement 10. The cover 3 is arranged in a vehicle roof 2 of the motor vehicle 1 and, for example, is designed to be displaceable relative to the vehicle roof 2 in order optionally to open up and to close a roof opening in the vehicle roof 2.

A simple and space-saving guide mechanism can be realized by means of the arrangement 10, which mechanism can be produced cost-effectively and which permits a reliable raising, displacing and adjusting of the cover 3. The arrangement 10 and a corresponding method for producing such an arrangement 10 will be explained in more detail with reference to FIGS. 2A-2B and FIG. 3 below.

Figure 2A:
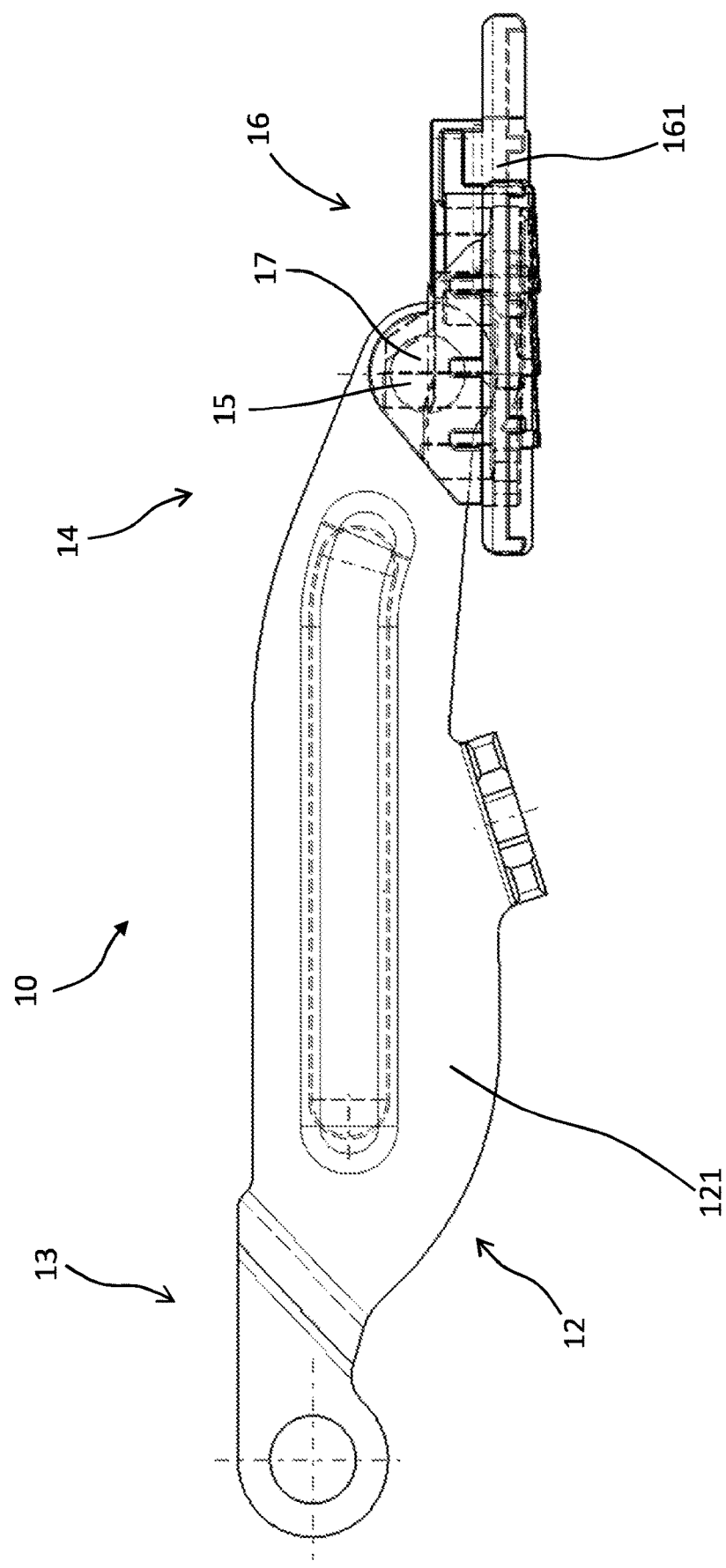

FIG. 2A shows, in a cross section, a first element 12 with a first end 13 and a second end 14. At the second end 14, a second element 16 is coupled to the first element 12, said second element being formed at a predetermined position at the second end 14 by means of injection molding.

In the exemplary embodiment illustrated, the first element 12 is designed as a raising lever 121 and the second element 16 as a plastics slider 161. In further refinements of the arrangement 10, the first and the second element 12 and 16 are designed, for example, as levers and are coupled to each other by means of injection molding and realize part of a lever mechanism for opening the vehicle roof 2, which optionally realizes a convertible folding roof.

The plastics slider 161 is configured in such a manner that it is pivotable relative to the raising lever 121 about an axis of rotation A. For this purpose, the plastics slider 161 has a rotary element 17 which extends through a recess 15 at the second end 14 of the raising lever 121.

Owing to the fact that the plastics slider 161 is formed by means of injection molding, the rotary element 17 is produced integrally with the plastics slider 161 as part thereof. No additional coupling elements, such as bolts or rivets, are therefore required in order to attach the plastics slider 161 to the raising lever 121, and the arrangement 10 can be produced in a cost-effective and time-saving manner within the scope of a production method.

The raising lever 121 is couplable by means of the first end 13 to the cover 3. The raising lever 121 is coupled by means of the second end 14 and the plastics slider 161 formed thereon, for example, to a guide rail in which the plastics slider 161 is arranged. A space-saving guide mechanism for the cover 3 can therefore be realized in a simple manner with a particularly low number of components by means of the arrangement 10 in order to raise the cover 3 in order to open up the roof opening in the vehicle roof 2 and to adjust same for closing the roof opening in the vehicle roof 2.

FIG. 2B shows a cross section of the arrangement 10 at a position of the second end 14 through the rotary element 17 of the plastics slider 161 and the recess 15 of the raising lever 121. The cross section illustrated is oriented substantially perpendicularly to the cross section illustrated in FIG. 2A. It can be seen with reference to FIG. 2B that the rotary element 17 is formed integrally with the plastics slider 161 about the axis of rotation A. The further illustrated edges and shapes of the plastics slider 161 and also of the raising lever 121 have been designed as predetermined geometries within the scope of a production method. Such a method for producing the arrangement 10 will be explained in more detail below with reference to FIG. 3.

Figure 3:
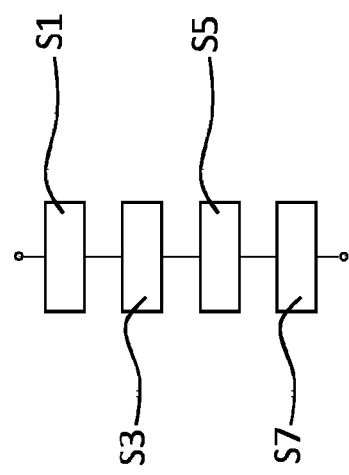
FIG. 3 shows a sequence diagram for a method for producing an arrangement for a cover.

FIG. 3 shows a sequence diagram for a method for producing the arrangement 10, in which, in a step S1, the raising lever 121 is provided with the predetermined geometry. The geometry comprises in particular the recess 15 at the second end 14 and optionally also radial regions which permit pivoting of the plastics slider 161 to be formed on the raising lever 121. The raising lever 121 is optionally not provided with a predetermined geometry but rather, in step S1, is formed by means of punching and/or stamping a metal blank. Edges, bent portions, projecting regions and/or further recesses can thereby also be formed at predetermined positions of the metal blank in order to configure the raising lever 121 for reliably and securely guiding the cover 3.

In a further step S3, the raising lever 121 is positioned and clamped, for example, in a specific manner in a mold which permits the formation of the plastics slider 161 by means of injection molding. Such a mold comprises, for example, an upper mold and lower mold with predetermined recesses and cavities which determine the shape to be formed of the plastics slider 161.

In a further step S5, predetermined cavities of the mold are filled with a provided substance and the plastics slider 161 is thereby formed in a specific manner at or around the second end 14 of the raising lever 121. During the formation of the plastics slider 161 it is ensured that the latter does not permanently adhere to the raising lever 121 and therefore a relative rotational movement of said two components with respect to each other is possible. In this regard, for example, the materials of the raising lever 121 and of the plastics slider 161 are coordinated with each other.

The raising lever 121 is realized, for example, as a metal lever to which the provided substance, from which the plastics slider 161 is formed by means of injection molding, is applied. The provided substance has, for example, material properties which lead to a non-adhering or easily detachable behavior of the shape of the plastics slider 161 on the raising lever 121. For example, the plastics slider 161 is manufactured from a material combination consisting of polyamide and carbon fiber, which is injection molded onto the metallic raising lever 121 and forms the plastics slider 161. The plastics slider 161 is therefore realized pivotably about the axis of rotation A and is adapted to the shape of the second end 14 of the raising lever 121 and overall has a radial geometry complementary to that of the raising lever 121 wherever a rotational movement is intended to be permitted.

In a further step S7, the arrangement 10 produced in such a manner is then coupled, for example, to the cover 3 and a guide rail in order to realize a roof module or a system for the vehicle roof 2 of the motor vehicle 1.

By means of the method described, a cost-effective and space-saving configuration of the arrangement 10 for guiding the cover 3 can be realized in a simple manner, said arrangement essentially merely comprising two components which are rotatable with respect to each other, the raising lever 121 and the plastics slider 161 which permit reliable raising, displacing and adjusting of the cover 3 in the vehicle roof 2. No additional components or process steps are necessary, and therefore the described method makes a contribution to a simple installation process of a space-saving guide mechanism or cover mechanism.

LIST OF REFERENCE SIGNS

1 Motor vehicle
2 Vehicle roof
3 Cover
10 Arrangement
12 First element
121 Raising lever
13 First end of the raising lever
14 Second end of the raising lever
15 Recess of the raising lever 16 Second element
161 Plastics slider
17 Rotary element of the plastics slider
A Axis of rotation

The invention claimed is:

1. A method for producing an arrangement for a vehicle roof, comprising providing a first element with a first end and a second end, the element being couplable by the first end to the vehicle roof, providing a pumpable substance with predetermined material properties, and applying the provided substance by injection molding at a predetermined position at the second end of the first element and thereby forming a second element such that the second element is coupled to the first element and is pivotable relative to the first element about an axis of rotation (A); and wherein the providing of the first element comprises: providing the first element with a recess at the second end such that, by applying the provided substance by injection molding, the second element is formed with a rotary element which is arranged in the recess.

2. The method according to claim 1, further comprising providing the first element as a raising lever which is couplable by the first end to a cover for the vehicle roof, and applying the provided substance by injection molding at a predetermined position at the second end of the raising lever and thereby forming the second element as a plastics slider such that the plastics slider is coupled to the raising lever and is pivotable relative to the raising lever about the axis of rotation (A).

3. The method according to claim 1, wherein the step of providing of the first element comprises: providing the first element with a predetermined radial geometry at the second end such that, by applying the provided substance by injection molding, the second element is formed with a radial geometry.

4. The method according to claim 1, wherein the step of providing of the first element comprises: punching and/or stamping a metal blank and thereby forming the first element with the first and second end and the recess and/or the predetermined radial geometry.

5. An arrangement for a vehicle roof, comprising a first element with a first end and a second end, the element being couplable by the first end to the vehicle roof, and a second element which is formed by injection molding at a predetermined position at the second end of the first element with a predetermined geometry such that the second element is coupled to the first element and is arranged pivotably relative to the first element about an axis of rotation (A); and wherein the first element has a recess at the second end, and the second element has a rotary element which is formed by infection molding and is arranged in the recess of the first element.

6. The arrangement according to claim 5, wherein the first element is a raising lever which is couplable by the first end to a cover for the vehicle roof, and the second element is a plastics slider which is formed by injection molding at a predetermined position at the second end of the raising lever with a predetermined geometry such that the plastics slider is coupled to the raising lever and is arranged pivotably relative to the raising lever about the axis of rotation (A).

7. The arrangement according to claim 5, wherein the first element has, at the second end, a predetermined radial geometry about which the second element is formed by injection molding.

8. A system for a motor vehicle with a vehicle roof, comprising a cover which is designed to optionally open up and to close a roof opening in the vehicle roof, and an arrangement according to claim 6, wherein the cover is coupled to the raising lever and the plastics slider is coupled to a guide rail, in order to raise the cover in order to open up the roof opening in the vehicle roof and to set same for closing the roof opening in the vehicle roof.

* * * * *